US012539341B2

(12) United States Patent
Childress (10) Patent No.: US 12,539,341 B2
(45) Date of Patent: Feb. 3, 2026

(54) SYSTEMS AND METHODS FOR SANITIZATION OF PROXIMATE REGIONS BETWEEN INDIVIDUALS WITH ULTRAVIOLET LIGHT

(71) Applicant: The Boeing Company, Chicago, IL (US)

(72) Inventor: Jamie J. Childress, Seattle, WA (US)

(73) Assignee: THE BOEING COMPANY, Arlington, VA (US)

(*) Notice: Subject to any disclaimer, the term of this patent is extended or adjusted under 35 U.S.C. 154(b) by 665 days.

(21) Appl. No.: 17/709,086

(22) Filed: Mar. 30, 2022

(65) Prior Publication Data

US 2022/0354976 A1 Nov. 10, 2022

Related U.S. Application Data

(60) Provisional application No. 63/183,649, filed on May 4, 2021.

(51) Int. Cl.
*A61L 2/10* (2006.01)
*A61L 2/24* (2006.01)
(Continued)

(52) U.S. Cl.
CPC ............... *A61L 2/10* (2013.01); *A61L 2/24* (2013.01); *A61L 9/20* (2013.01); *H05B 47/115* (2020.01);
(Continued)

(58) Field of Classification Search
CPC .......... A61L 2/24; A61L 2/28; A61L 2202/14; A61L 2/10; A61L 2202/16;
(Continued)

(56) References Cited

U.S. PATENT DOCUMENTS

| 5,483,127 A | 1/1996 | Widmayer |
| 6,877,248 B1 | 4/2005 | Cross et al. |

(Continued)

FOREIGN PATENT DOCUMENTS

| CA | 2777014 | 4/2011 |
| CA | 2904971 | 7/2016 |

(Continued)

OTHER PUBLICATIONS

Extended European Search Report prepared by the European Patent Office in application No. EP 22 16 4829.8 dated Sep. 29, 2022.

(Continued)

*Primary Examiner* — Wyatt A Stoffa
(74) *Attorney, Agent, or Firm* — MH2 Technology Law Group LLP (57) ABSTRACT

A sanitization system for a space includes an ultraviolet (UV) light source configured to emit UV light. The system includes a sensor device configured to sense positions of a plurality of individuals within the space. The system includes a controller in communication with the sensor device. The controller is configured to monitor the positions of the plurality of individuals, determine, based on the positions of the plurality of individuals, that two or more individuals are less than a threshold distance from each other, and in response to determining that the two or more individuals are less than a threshold distance from each other, control the UV light source to emit UV light towards a proximate region between the two or more individuals.

20 Claims, 8 Drawing Sheets

(51) Int. Cl.
  *A61L 9/20* (2006.01)
  *H05B 47/115* (2020.01)
(52) U.S. Cl.
  CPC ....... *A61L 2202/14* (2013.01); *A61L 2202/16* (2013.01)
(58) Field of Classification Search
  CPC .. A61L 2202/25; A61L 2209/111; A61L 9/20; H05B 47/115
  See application file for complete search history.

(56) References Cited

U.S. PATENT DOCUMENTS

| | | | |
|---|---|---|---|
| 8,084,752 | B2 | 12/2011 | Ranta et al. |
| 8,138,690 | B2 | 3/2012 | Chemel et al. |
| 8,339,069 | B2 | 12/2012 | Chemel et al. |
| 8,368,321 | B2 | 2/2013 | Chemel et al. |
| 8,543,249 | B2 | 9/2013 | Chemel et al. |
| 8,552,664 | B2 | 10/2013 | Chemel et al. |
| 8,593,135 | B2 | 11/2013 | Chemel et al. |
| 8,805,550 | B2 | 8/2014 | Chemel et al. |
| 8,954,170 | B2 | 2/2015 | Chemel et al. |
| 9,623,133 | B2 | 4/2017 | Childress et al. |
| 9,700,072 | B2 | 7/2017 | Dobrinsky et al. |
| 9,783,974 | B1 | 10/2017 | Tillotson |
| 9,855,353 | B1 | 1/2018 | Stacy |
| 9,993,571 | B2 | 6/2018 | Lin et al. |
| 10,130,727 | B1 | 11/2018 | Byrnes et al. |
| 10,145,055 | B1 | 12/2018 | Harlan et al. |
| 10,272,169 | B2 | 4/2019 | Lin et al. |
| 10,301,806 | B2 | 5/2019 | Childress et al. |
| 10,449,895 | B2 * | 10/2019 | Pozzi ........................ B60Q 3/47 |
| 10,893,990 | B1 | 1/2021 | Uda |
| 10,918,749 | B2 * | 2/2021 | Hatti .......................... B64F 5/30 |
| 10,987,440 | B1 * | 4/2021 | Sood ...................... G01J 5/0025 |
| 11,446,403 | B2 * | 9/2022 | Duncan ...................... A61L 9/20 |
| 11,938,238 | B2 * | 3/2024 | Ismail .................. A61B 1/0623 |
| 12,214,095 | B2 * | 2/2025 | Tomizawa ................ A61L 2/10 |
| 2006/0163135 | A1 | 7/2006 | Ellis et al. |
| 2010/0193629 | A1 | 8/2010 | Breit et al. |
| 2011/0057123 | A1 | 3/2011 | Ho |
| 2011/0155915 | A1 | 6/2011 | Brueck et al. |
| 2012/0282135 | A1 | 11/2012 | Trapani |
| 2013/0330235 | A1 | 12/2013 | Stibich et al. |
| 2014/0059796 | A1 | 3/2014 | Boodaghians et al. |
| 2014/0266695 | A1 | 9/2014 | Addison et al. |
| 2016/0088868 | A1 | 3/2016 | Dobrinsky et al. |
| 2016/0195427 | A1 | 7/2016 | Vance et al. |
| 2016/0220716 | A1 | 8/2016 | Childress et al. |
| 2016/0250362 | A1 | 9/2016 | Mackin |
| 2017/0107659 | A1 | 4/2017 | Hills |
| 2017/0246329 | A1 | 8/2017 | Lloyd |
| 2017/0246331 | A1 * | 8/2017 | Lloyd ..................... A61Q 17/04 |
| 2017/0283062 | A1 | 10/2017 | Childress |
| 2017/0283092 | A1 | 10/2017 | Brown et al. |
| 2017/0284076 | A1 | 10/2017 | Jensen |
| 2018/0050122 | A1 | 2/2018 | Lin et al. |
| 2018/0051447 | A1 | 2/2018 | Hills et al. |
| 2018/0064833 | A1 | 3/2018 | Childress et al. |
| 2018/0079528 | A1 | 3/2018 | Siegmeth et al. |
| 2018/0084956 | A1 | 3/2018 | Childress |
| 2018/0369434 | A1 | 12/2018 | Callahan |
| 2018/0369439 | A1 | 12/2018 | Brockschmidt et al. |
| 2018/0371733 | A1 | 12/2018 | Childress et al. |
| 2018/0373157 | A1 | 12/2018 | Kimsey-Lin |
| 2019/0171111 | A1 | 6/2019 | Kimsey-Lin |
| 2020/0345875 | A1 * | 11/2020 | Trapani ............... H01M 10/425 |
| 2022/0088249 | A1 * | 3/2022 | Kyle ...................... B60Q 3/217 |
| 2023/0390446 | A1 * | 12/2023 | Saito ........................ A61L 9/20 |

FOREIGN PATENT DOCUMENTS

| | | |
|---|---|---|
| DE | 19824423 | 12/1999 |
| JP | H08 31585 | 2/1996 |
| JP | 2002263645 | 9/2002 |
| WO | 99/62567 | 12/1999 |

OTHER PUBLICATIONS

"Jetson Nano Developer Kit", accessible at https://developer.nvidia.com/embedded/jetson-nano-developer-kit (dated at least prior to May 4, 2021).

* cited by examiner

SYSTEMS AND METHODS FOR SANITIZATION OF PROXIMATE REGIONS BETWEEN INDIVIDUALS WITH ULTRAVIOLET LIGHT

CROSS-REFERENCE TO RELATED APPLICATIONS

The present application claims the benefit of U.S. Provisional Application No. 63/183,649, filed May 4, 2021, the contents of which is hereby incorporated by reference in its entirety.

FIELD

The present disclosure generally relates to systems and methods for light systems, and more particularly to systems and methods for operating ultraviolet (UV) light sources to disinfect an environment.

BACKGROUND

Pathogens may be spread between humans, between animals, or between humans and animals in many different ways. Consequently, there is an increasing need for the disinfection of public environments. One approach for disinfecting an environment involves irradiating the environment with ultraviolet (UV) light using UV light sources.

SUMMARY

In an example, a sanitization system for a space is described. The system includes a sensor device configured to sense positions of a plurality of individuals within the space. The system includes a controller in communication with the sensor device. The controller is configured to monitor the sensed positions of the plurality of individuals, determine, based on the sensed positions of the plurality of individuals, that two or more individuals are less than a threshold distance from each other, and in response to determining that the two or more individuals are less than a threshold distance from each other, control the UV light source to emit UV light towards a proximate region between the two or more individuals.

In another example, a method for sanitizing a space is described. The method includes receiving, by a controller of a sanitization system, sensor data from a sensor device. The method includes monitoring, by the controller based on the sensor data, positions of a plurality of individuals within the space. The method includes determining, by the controller based on the positions of the plurality of individuals, that two or more individuals are less than a threshold distance from each other. The method includes, in response to determining that the two or more individuals are less than a threshold distance from each other, controlling, by the controller, a UV light source to emit UV light towards a proximate region between the two or more individuals.

In another example, a non-transitory computer readable medium is described. The non-transitory computer readable medium has instructions stored thereon that, when executed by one or more processors, cause a controller of a sanitization system to perform functions. The functions include monitoring, by the controller based on the sensor data, positions of a plurality of individuals within the space. The functions include determining, by the controller based on the positions of the plurality of individuals, that two or more individuals are less than a threshold distance from each other. The functions include, in response to determining that the two or more individuals are less than a threshold distance from each other, controlling, by the controller, a UV light source to emit UV light towards a proximate region between the two or more individuals.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example systems and methods for sanitizing a space are described. In these examples, a plurality of individuals may enter the space. For example, a public space (e.g., a building, a part of a building, an outdoor area, or another environment) may include many people who enter and exit the space at different times, remain in the space for different amounts of time, and move within the space differently. Some individuals may stay in the space for longer periods of time. For example, some individuals may be residents of, or work within, the space. Others may be visitors, such as patrons of a business, travelers, sightseers, or others who stay in the space for a relatively short period of time.

Emitting UV light at an area with a plurality of individuals disinfects surfaces and air between the individuals. Accordingly, emitting UV light towards a space, particularly congested areas of the space, may effectively eliminate or mitigate pathogens in an environment. This effect may be particularly pronounced when emitting light between individuals who are relatively close to one another. However, it is also desirable to limit a level of UV light exposure experienced by each individual. In order to ensure that the space is effectively disinfected while also limiting UV light exposure for individuals in the space, particularly those who are expected to remain within the space for extended periods of time, the sanitization system tracks each individual user and emits UV light in a targeted manner.

Within examples, a sanitization system is configured to categorize different types of individuals within a space. This allows the sanitization system to control how UV light is emitted, perhaps by avoiding a particular type of individual while emitting UV light towards other individuals. In this manner, the UV light system can expose the particular type of individual to UV light more gradually to account for the particular type of individual remaining in the space for longer periods of time. The sanitization may also track individuals of the particular type to emit UV light any time another individual is less than a threshold distance away. In this manner, for example, the sanitization system can protect residents or workers in a space from pathogens brought in by visitors.

Within examples, a sanitization system is configured to track one or more UV exposure parameters (e.g., total exposure levels) for each individual in a UV light zone (e.g., an area in which UV light is emitted). This allows the sanitization system to adjust when, where, and how much UV light is emitted within the space in order to control the amount of UV light emitted toward each individual. As used herein, the term "exposure level" refers to an amount of incident light directed towards a given area over a period of time. For example, the exposure level may be represented in terms of Joules/Meter$^2$. An exposure level for an individual may be determined using a light level of a UV light source, an amount of time that the individual is exposed to UV light, and an area associated with an individual (e.g., a 0.5 m$^2$).

Figure 1:
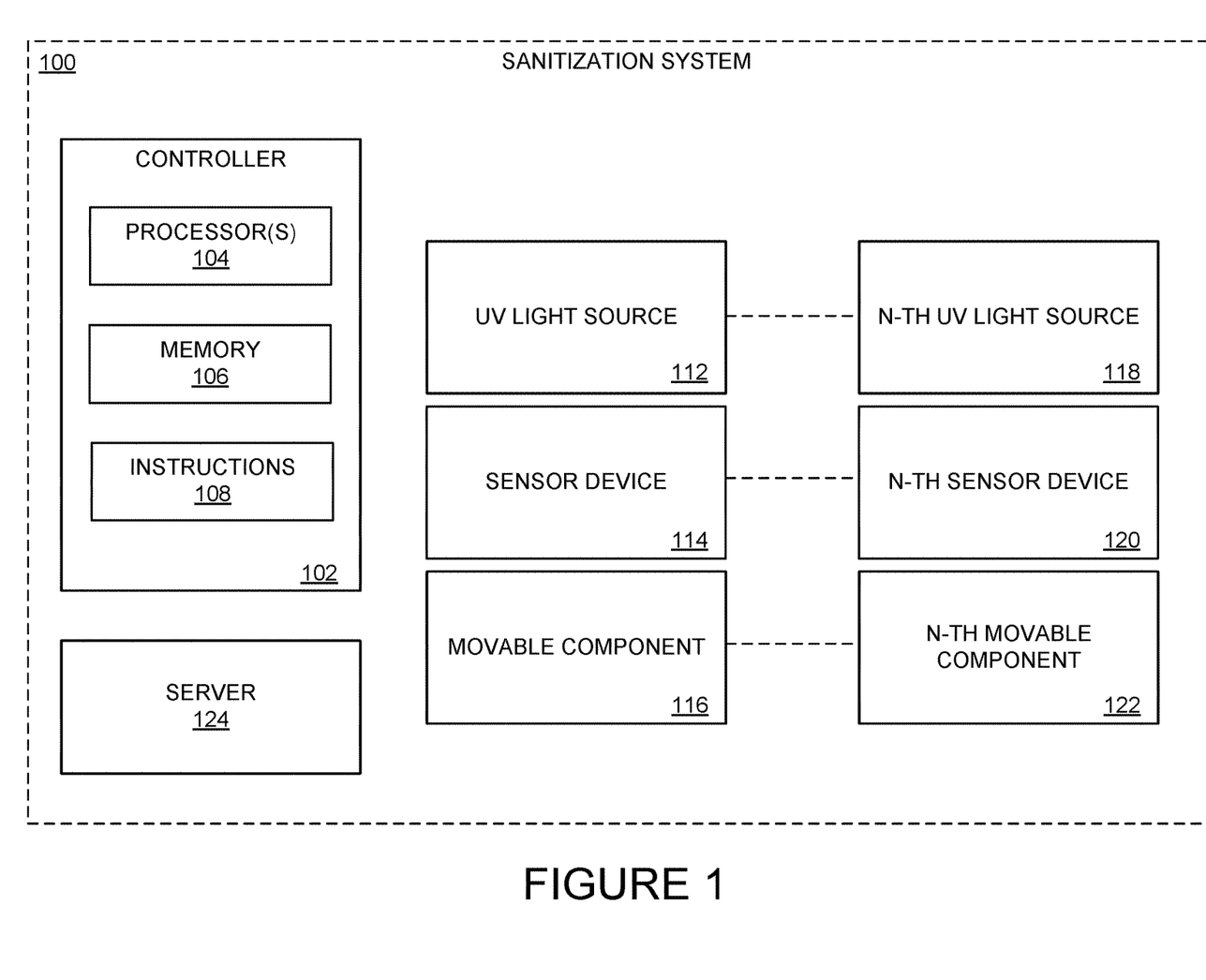
FIG. 1 illustrates a block diagram of a sanitization system, according to an example implementation.

Referring now to the figures, FIG. 1 illustrates a block diagram of a sanitization system, according to an example implementation. In particular, FIG. 1 shows a sanitization system 100 for a space. In the depicted example, the sanitization system 100 includes a controller 102 and a plurality of UV light sources, sensor devices, and movable components.

The sanitization system 100 can be a computing system that includes one or more computing devices, such as the controller 102. For example, the controller 102 can be a central controller of the sanitization system 100, and can interact with one or more additional computing devices to perform functions. The controller 102 includes processor(s) 104, a memory 106, and instructions 108.

The processor(s) 104 may be general-purpose processors or special purpose processors (e.g., digital signal processors, application specific integrated circuits, etc.). Processor(s) 104 are configured to execute the instructions 108 stored in the memory 106 to provide the functionality of the controller 102 and related systems and methods described herein.

The memory 106 may include or take the form of one or more computer-readable storage media that can be read or accessed by processor(s) 104. The computer-readable storage media can include volatile and/or non-volatile storage components, such as optical, magnetic, organic or other memory or disc storage, which can be integrated in whole or in part with processor(s) 104. In some examples, memory 106 can be implemented using a single physical device (e.g., one optical, magnetic, organic or other memory or disc storage unit), while in other examples, memory 106 can be implemented using two or more physical devices. The memory 106 thus is a non-transitory computer readable storage medium, and the instructions 108 are stored thereon. The instructions 108 include computer executable code. For example, the controller 102 may be configured to control aspects of the sanitization system in accordance with the instructions 108.

The plurality of UV light sources, sensor devices and movable components includes a UV light source 112, a sensor device 114, and a movable component 116. Within examples, the UV light source 112, the sensor device 114, and the movable component 116 may be integrated within a single device, or may be separate devices in communication with one another or with the controller 102. The plurality of UV light sources, sensor devices and movable components further includes an n-th UV light source 118, an n-th sensor device 120, and an n-th movable component 122. Each UV light source may be a light emitting device that emits light in the UV spectrum (e.g., about 100-400 nm). For example, each UV light source may include one or more of a UV lamp, a UV light emitting diode (LED), or a UV laser. Each motion sensor device includes a sensor configured to track positions of one or more objects. For example, each motion sensor device may include a proximity sensor, an infrared (IR) tracking sensor, an image capture device (e.g., a camera), a light detection and ranging (LIDAR) device, or another device capable of tracking positions of individuals in the space. Each movable component includes one or more of a switch, a servo, an actuator, an aperture, or another device configured to cause the UV light source to adjust a direction, beam angle, or beam spread of UV light emitted by the UV light source. The controller 102 can determine a desired light profile for UV light emitted from a respective UV light source, and can control a respective movable component to cause the respective UV light to emit light using the desired light profile.

In order to manage UV light exposure levels for each individual within the space, the controller 102 may track one or more exposure parameters (e.g., total time exposed to UV light or total UV light exposure level) for individual users across each respective UV light zone. To facilitate this, a server 124 may be used for storing exposure parameter values for each user and characteristics of UV light emission in each UV light zone. The controller 102 may access this information to determine control instructions for respective UV light sources in the sanitization system 100. In this manner, for example, the controller 102 can control the n-th UV light source 118 based on UV light exposure of an individual.

In addition, the controller 102 can manage UV light exposure levels based on a proximity of two or more individuals in the space. For example, if the two or more individuals are within a threshold distance of one another, the controller 102 can cause a UV light source to emit UV light between the two or more individuals. The controller 102 may determine a desired light profile to avoid each of the individuals, to avoid a particular individual based on a type of the particular individual, or to expose each individual to UV light in order to disinfect each individual and a proximate region between the two or more individuals.

Other configurations of the sanitization system 100 are possible. For example, more or fewer UV light sources, sensor devices, and movable components may be included in the space. Further, a controller may by dedicated to each UV light source or sensor device. Within example, the controller 102 may be a computing device within the server 124, or may be directly connected to one or both of a motion sensor device and a UV light source.

Accordingly, FIG. 1 shows that the sanitization system 100 includes a UV light source (e.g., the UV light source 112) configured to emit UV light, a sensor device (e.g., the sensor device 114) configured to sense positions of a plurality of individuals within the space, and a controller (e.g., the controller 102) in communication with the UV light source and the sensor device. The controller is configured to monitor the positions of the plurality of individuals. The controller is further configured to determine, based on the positions of the plurality of individuals, that two or more individuals are less than a threshold distance from each other. The controller is further configured to, in response to determining that the two or more individuals are less than a threshold distance from each other, control the UV light source to emit UV light towards a proximate region between the two or more individuals. Other functionality of sanitization systems are described below with respect to FIGS. 2A-5. The sanitization system 100, the controller 102, or portions thereof are configured to carry out this functionality, either individually or in conjunction with other devices or systems. Further details of sanitizing a space using UV light are provided below with respect to FIGS. 2A-5.

Figure 2A:
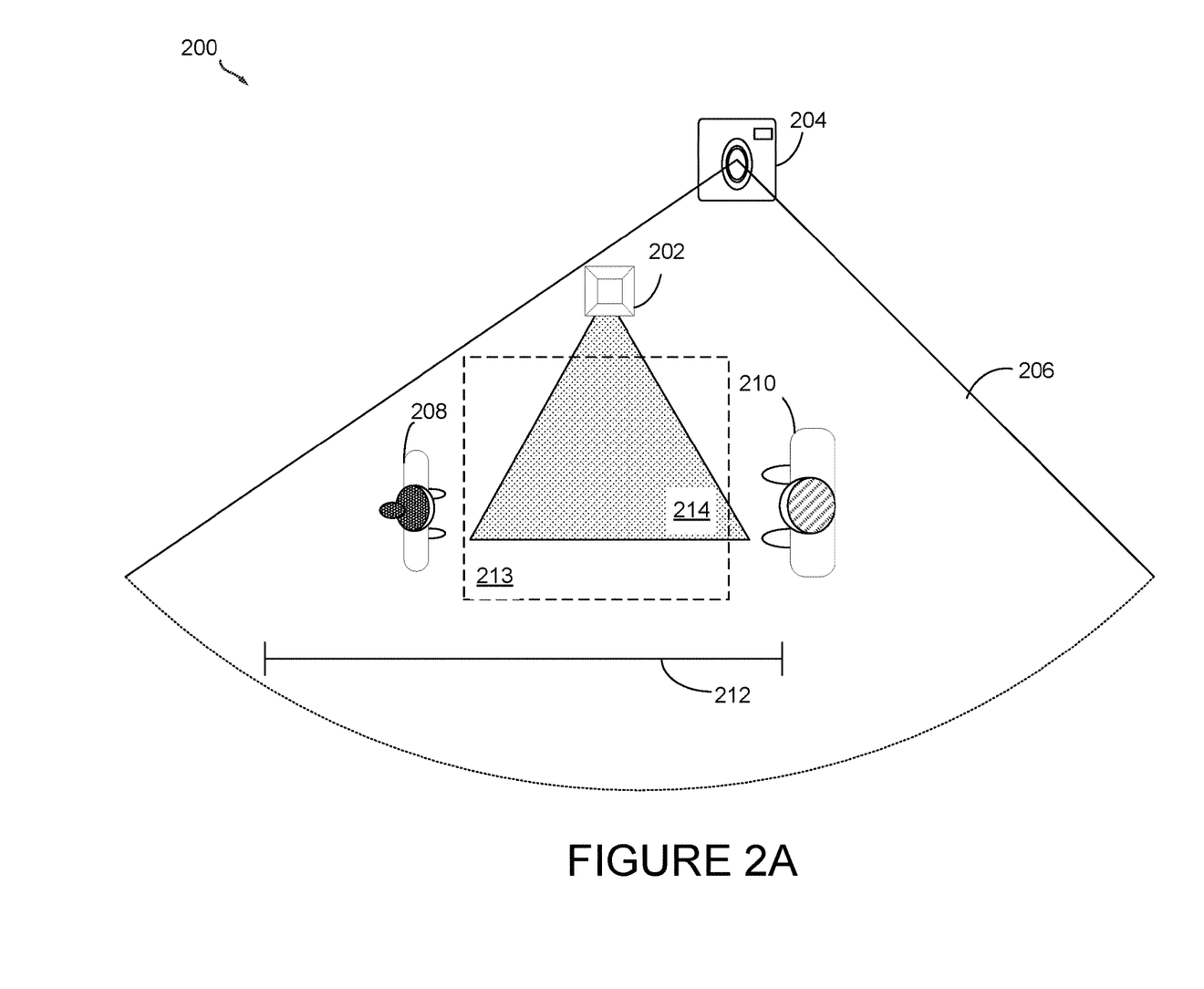
FIG. 2A illustrates a first context of operating a sanitization system in an environment, according to an example implementation.

FIG. 2A illustrates a first context of operating a sanitization system in an environment, according to an example implementation. In particular, FIG. 2 shows a top view of a sanitization system 200 that includes a UV light source 202, a sensor device 204, and a controller (not shown). The UV light source 202 is configured to emit UV light towards specified portions of the environment. The UV light can be emitted at a UV light level (e.g., a brightness level or power level of emitted UV light). The sensor device 204 is configured to sense positions of individuals in the environment. For example, the sensor device can be an image capture device configured to capture images within a field of view 206. The images can be used for identifying different individuals. For example, facial recognition techniques, object identification techniques, or other image processing frameworks can be used for identifying different individuals. The sensor device 204 may include other sensors, such as IR sensors, LIDAR devices, proximity sensors, or other devices configured for detecting positions and/or movement of one or more individuals.

FIG. 2A shows a first individual 208 and a second individual 210. The sensor device 204 generates data used for determining positions of the first individual 208 and the second individual 210. The controller compares a distance between the first individual 208 and the second individual 210 to a threshold distance 212 to determine whether to emit UV light between the first individual 208 and the second individual 210. In FIG. 2A, the distance is less than the threshold distance 212. In response to determining that the distance is less than the threshold distance 212, the controller causes the UV light source 202 to emit UV light towards a proximate region 213 between the first individual 208 and the second individual 210. The proximate region 213 is an area in the environment that separates the first individual 208 from the second individual 210. The controller causes the UV light source 202 to emit UV light in accordance with a light profile 214 in order to cover at least a portion of the proximate region 213. For example, the light profile 214 may be determined based on the positions of the first individual 208, the second individual 210, and may further be based on a position of the UV light source 202 in order to direct UV light towards at least a portion of the proximate region 213. Causing the UV light source 202 to emit UV light in accordance with the light profile 214 may include using a movable component (e.g., the movable component 116) to adjust a direction and/or a spread of a beam of UV light emitted from the UV light source 202.

In FIG. 2A, the light profile 214 is directed between the first individual 208 and the second individual 210 based on a first context. For example, the controller may determine that both the first individual 208 and the second individual 210 are designated as a first type of individual that is expected to remain in the space for an extended period of time (e.g., more than two hours). Based on determining that both the first individual 208 and the second individual 210 are classified as the first type of individual, the controller may determine the light profile 214 such that UV light is directed away from both individuals while also covering at least a portion of the proximate region 213. In another example first context, the controller may determine the light profile 214 such that the UV light source 202 only emits light between individuals.

In another example first context, the sanitization system determines an exposure parameter value for each individual. For example, the exposure parameter value may be an amount of time that an individual is exposed to UV light, a total exposure level, or another parameter for quantifying how much UV light emitted toward the individual. The exposure parameter value may be compared to a threshold value to determine how to control the UV light source 202. For example, the threshold value can be set based on a Threshold Limit Value for UV exposure (e.g., a value lower than the Threshold Limit Value). The threshold value may be determined based on one or more characteristics of the UV light source 202. For example, the Threshold Limit Value may vary depending on the wavelength or range of wavelengths of UV light emitted by the UV light source 202, and the threshold value may be set based on the wavelength or range of wavelengths of UV light emitted by the UV light source 202. Accordingly, the controller may cause the UV light source 202 to (i) emit UV light towards the proximate region 213 and to emit light away from the first individual 208 and the second individual 210 based on one or more both of the first individual 208 and the second individual 210 having an exposure parameter value above the threshold value.

Figure 2B:
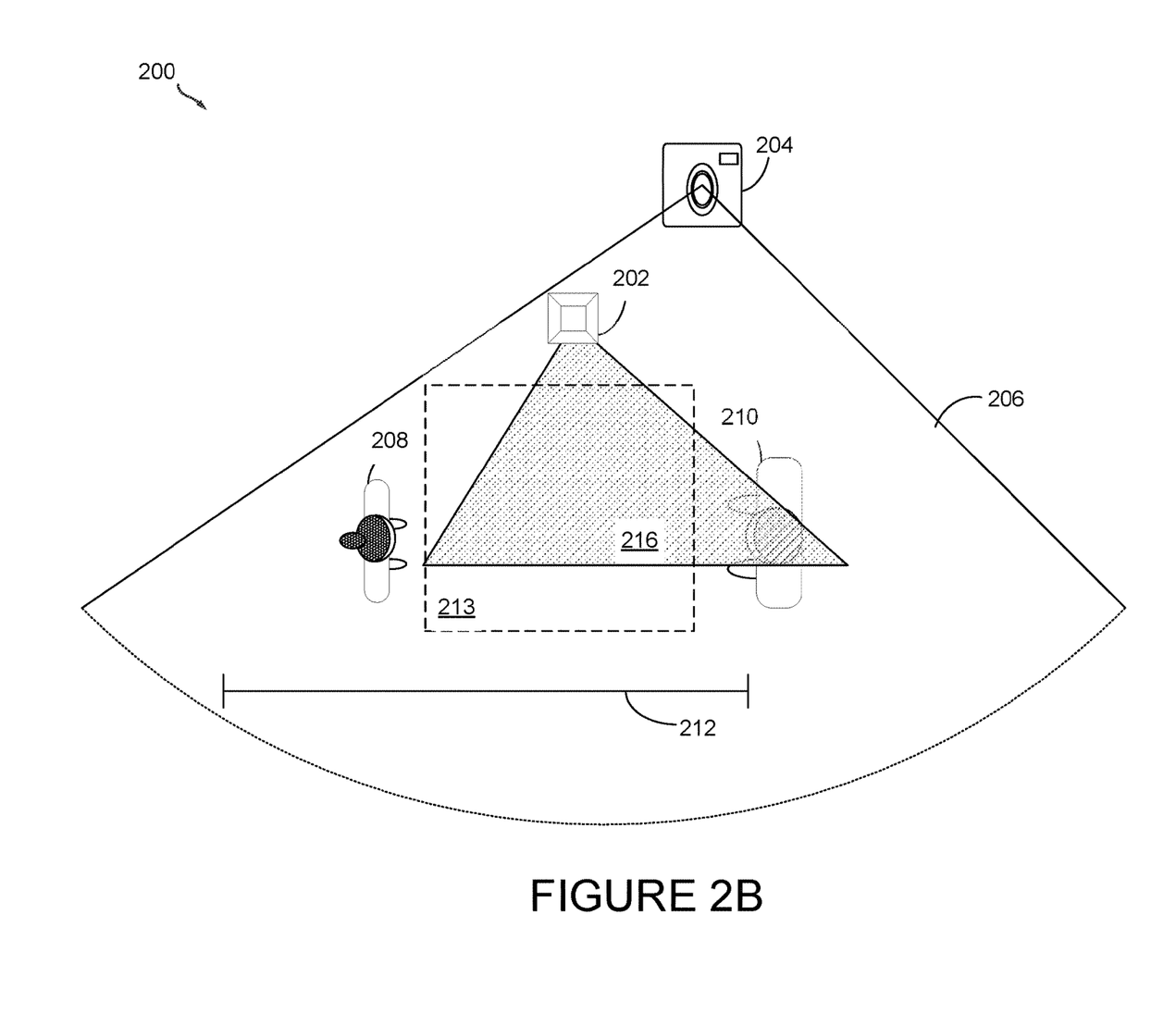
FIG. 2B illustrates a second context of operating a sanitization system in an environment, according to an example implementation.

FIG. 2B illustrates a second context of operating a sanitization system in an environment, according to an example implementation. In FIG. 2B, the controller causes the UV light source 202 to emit UV light in accordance with a light profile 216. The light profile 216 differs from the light profile 214 because the light profile 216 does not cover the first individual 208, but does cover at least a portion of the second individual 210. In the second context, the first individual 208 is classified as a first type of individual and the second individual 210 is classified as a second type of individual. The first type of individual is expected to remain in the space for an extended period of time. For example, the first type of individual may be resident of the space or work within the space. Accordingly, the controller sets the light profile 216 to omit the first individual 208 such that the first individual is exposed to UV light more gradually. By contrast, the second individual 210 is expected to remain in the space for less time and may bring pathogens from outside the space into the space. Accordingly, the controller sets the light profile 216 such that the second individual 210 is exposed to UV light more rapidly and in order to disinfect the second individual 210.

Figure 2C:
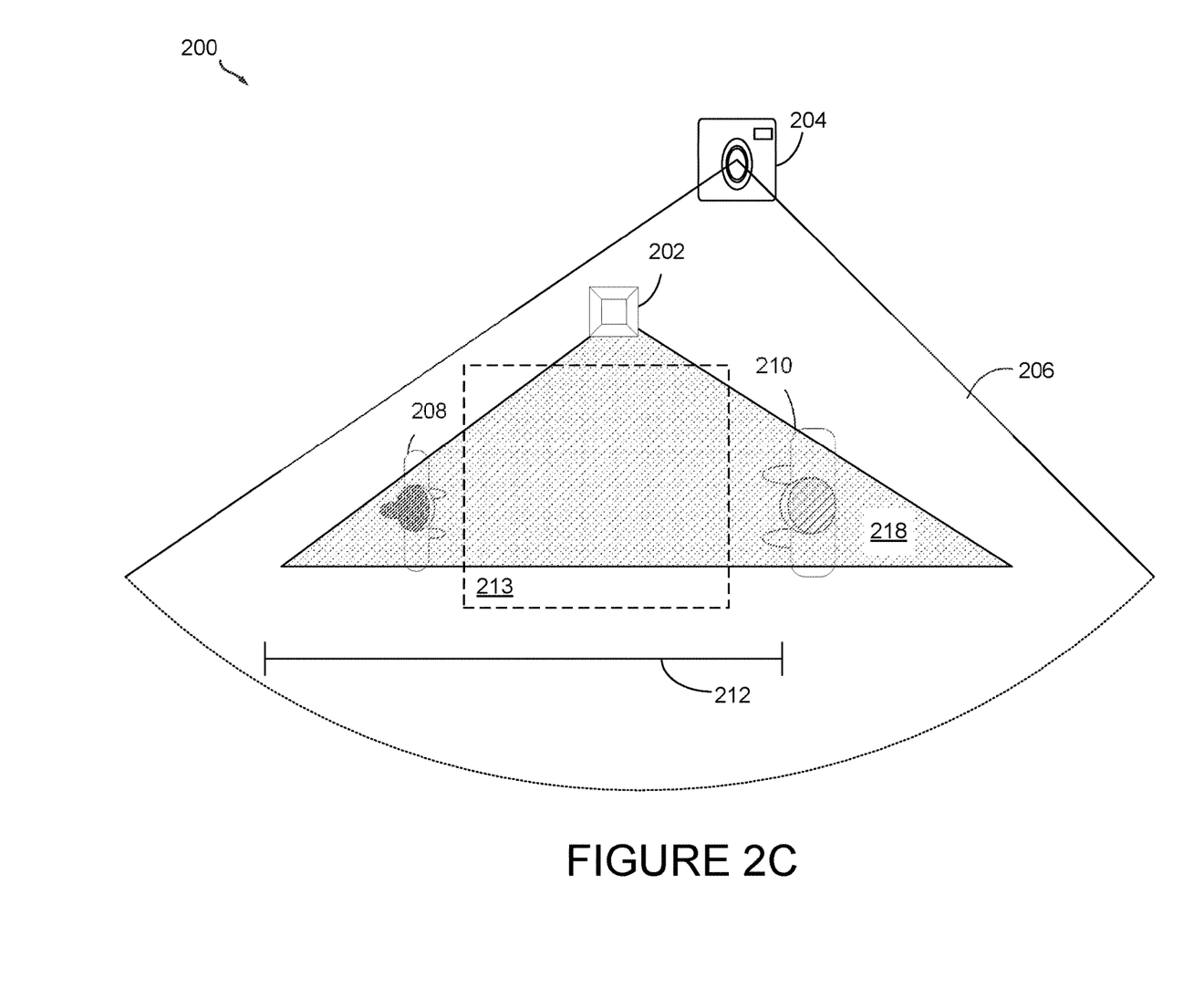
FIG. 2C illustrates a third context of operating a sanitization system in an environment, according to an example implementation.

FIG. 2C illustrates a third context of operating a sanitization system in an environment, according to an example implementation. In FIG. 2C, the controller causes the UV light source 202 to emit UV light in accordance with a light profile 281. The light profile 218 differs from the light profile 214 and the light profile 216 because the light profile 218 covers both the first individual 208 and the second individual 210. In the third context, both the first individual 208 and the second individual 210 are classified as the second type of individual. Accordingly, the controller sets the light profile 218 such that both the first individual 208 and the second individual 210 are exposed to UV light relatively rapidly and in order to disinfect the first individual 208 and the second individual 210. In another example third context, the controller may determine that the exposure parameter value for both individuals is below the threshold level, and responsively set the light profile 218 to cover the first individual 208 and the second individual 210.

Figure 3A:
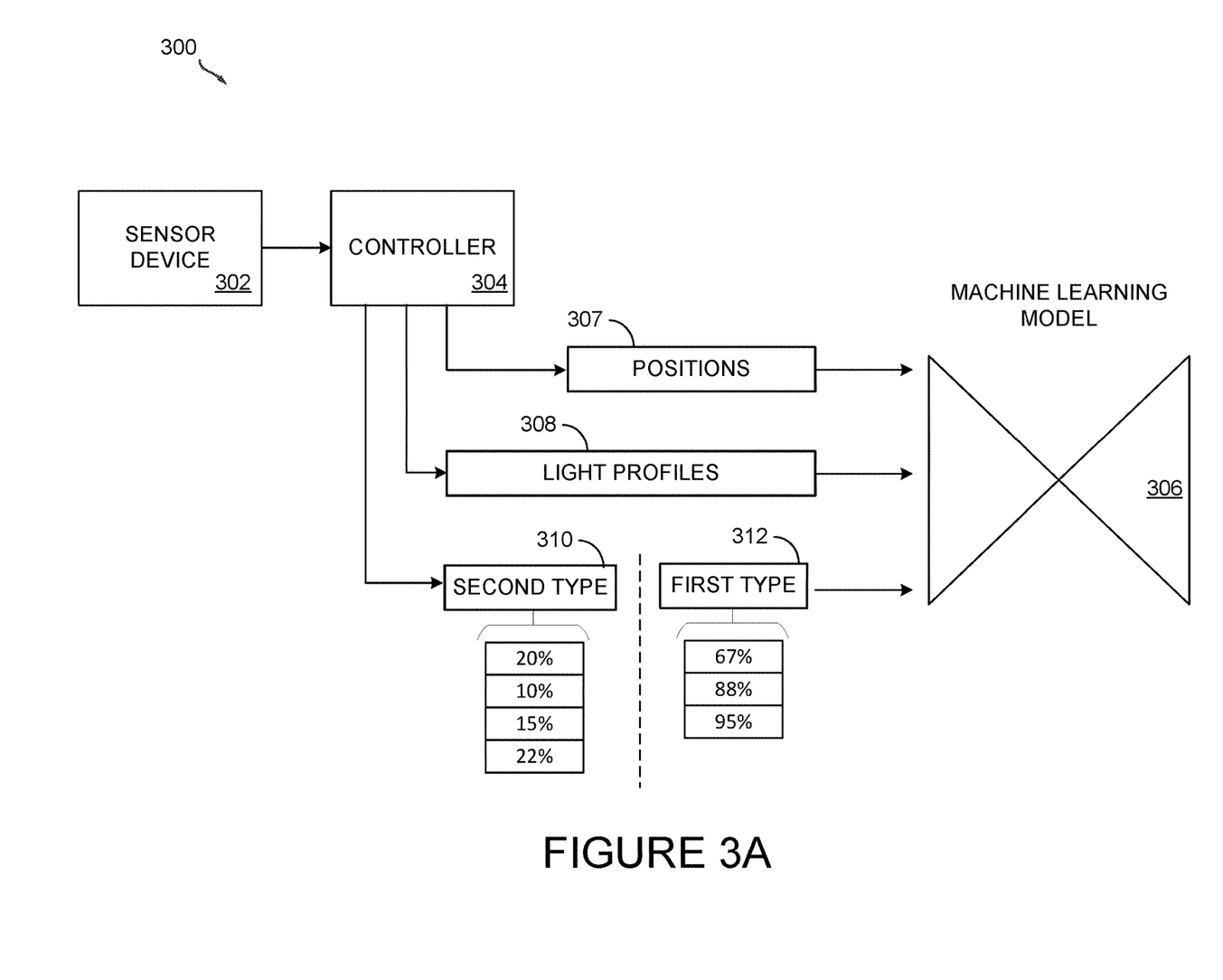
FIG. 3A illustrates a sanitization system training a machine learning model, according to an example implementation.

FIG. 3A illustrates a sanitization system training a machine learning model, according to an example implementation. In particular, FIG. 3A shows a sanitization system 300 training a machine learning model to output desired light profiles. The sanitization system 300 includes a sensor device 302 and a controller 304. The controller is configured to receive data from the sensor device 302 and to generate a plurality of light profiles 308. For example, each light profile may be set by the controller 304 as depicted in FIGS. 2A-2C. The controller is further configured to categorize each individual based on the data from the sensor device 302, and to track exposure parameter values (e.g., total exposure levels) for each user.

In FIG. 3A, the controller 304 has categorized a plurality of individuals into a first type 312 and a second type 310. Because the first type 312 is expected to remain in a space for an extended period of time, the light profiles 308 are generated to emit UV light away from individuals of the first type 312. Accordingly, the controller 304 may train the machine learning model 306 using only data relating to exposure parameter levels of the first type 312. In FIG. 3A, the controller 304 uses a plurality of positions 307 of individuals sensed by the sensor device 302 when UV light is emitted, the light profiles 308 used when UV light is emitted, and total exposure levels (e.g., a total exposure levels relative to a threshold level) for individuals of the first type 312 to train the machine learning model 306. In alternative examples, data from both the first type 312 of individual and the second type 310 of individual can be used for training the machine learning model 306.

Within examples, the machine learning model 306 can be a supervised model, such as a decision tree or support vector machine, an unsupervised model, such as a neural network, or another type of machine learning model configured to take in multiple inputs and to output a single output.

Figure 3B:
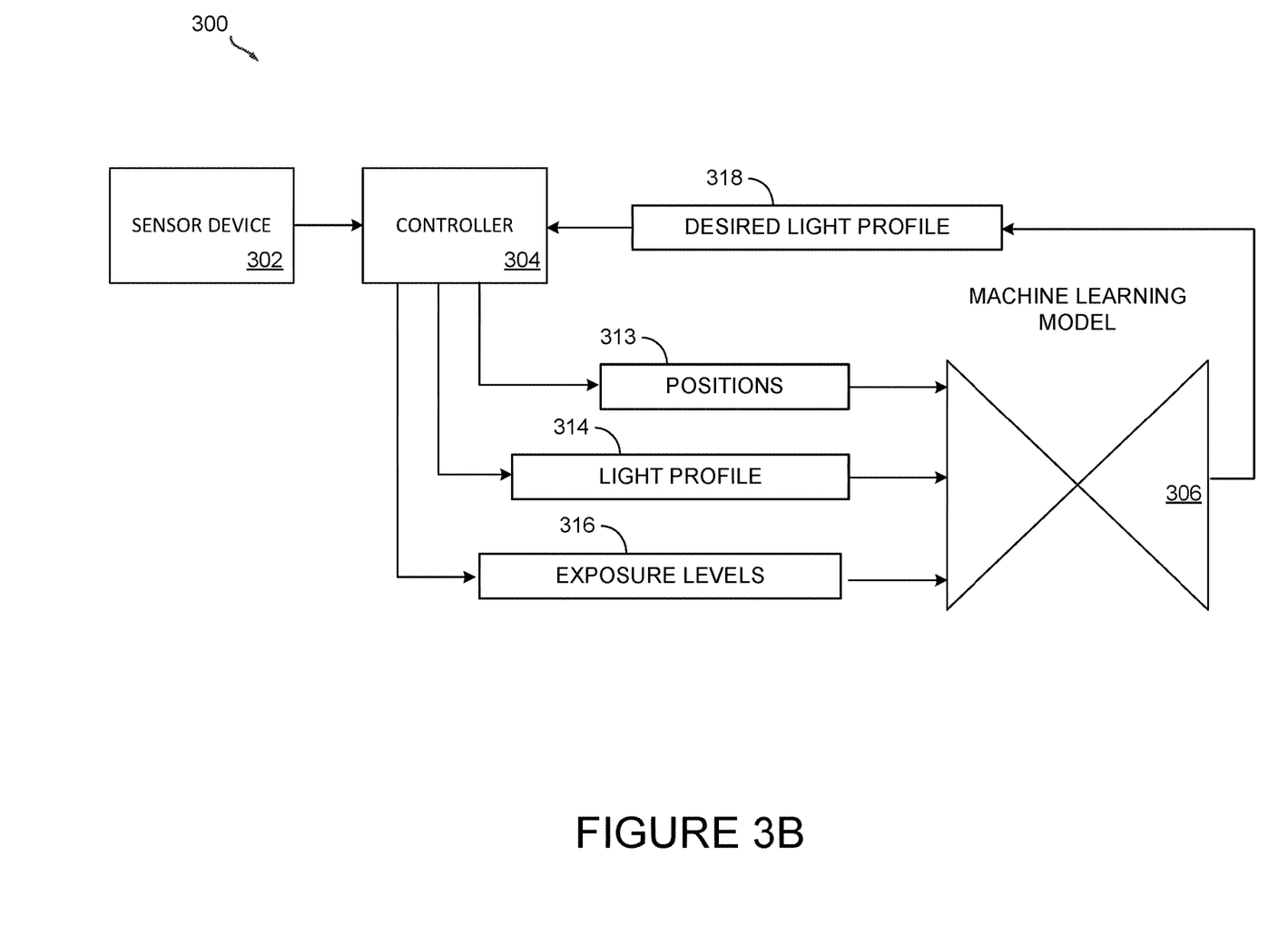
FIG. 3B illustrates a sanitization system applying a machine learning model to an input, according to an example implementation.

FIG. 3B illustrates the sanitization system 300 applying the machine learning model to an input, according to an example implementation. In particular, FIG. 3B shows the controller 304, having already trained the machine learning model 306, providing positions 313 of two or more individuals, a default light profile 314, and exposure levels 316 of each of the two or more individuals. Data corresponding to the exposure levels 316 may also indicate a type of individual associated with each exposure level. Similarly, data corresponding to the positions 313 may also indicate a type of individual at each position. The machine learning model generates a desired light profile 318 based on the inputs. For example, the machine learning model 306 may automatically determine how much UV light to emit towards each individual and to a proximate region between the individuals based on the inputs.

Figure 4:
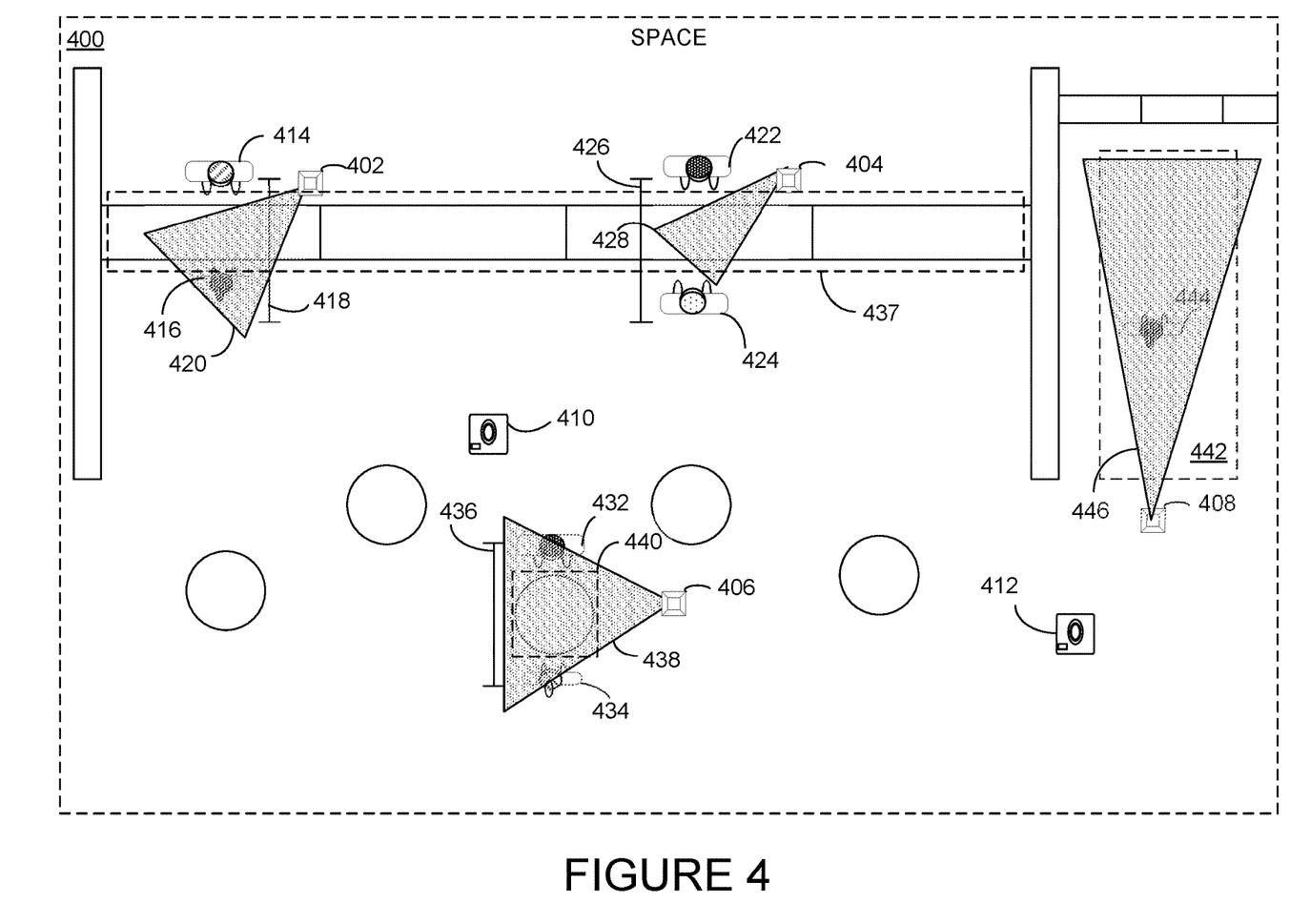
FIG. 4 illustrates a sanitization system operating in an environment having a plurality of UV light zones, according to an example implementation.

FIG. 4 illustrates a sanitization system operating in an environment having a plurality of UV light zones, according to an example implementation. In particular, FIG. 4 shows a space 400 that includes a UV light source 402, a second UV light source 404, a third UV light source 406, and a fourth UV light source 408. The space 400 further includes a first sensor device 410 and a second sensor device 412. The UV light sources and the sensor are part of a sanitization system that includes a controller (not shown).

The sanitization system is configured to monitor positions of individuals in the space 400 using the sensor devices, and to emit UV light using the UV light sources based at least in part on the positions of the individuals. A server may store data that represents positions of each individual in the space 400, characteristics of different UV lights sources, and exposure parameter values for each individual. The controller of the sanitization system can use this information to control each UV light source in the environment. For illustrative purposes, a plurality of individuals are shown interacting within the environment. For example, a first type of individual in the plurality of individuals may be an employee of one or more businesses associated with the space 400, and a second type of individual may be a patron the one or more businesses. The second type of individual may approach the first type of individual for goods or services. Because the first type of individual is expect to remain within the space 400 for the majority of a workday, and because several individuals of the second type may approach throughout the workday, the first type of individual has more opportunities to be exposed to UV light.

The UV light source 402 is proximate to a first individual 414 and a second individual 416. The first individual 414 is the first type of individual and the second individual 416 is the second type of individual. The sanitization system uses the first sensor device 410 to determine positions of the first individual 414 and the second individual 416. For example, the first sensor device 410 may include an image capture device with a field of view that covers the first individual 414 and the second individual 416, and the controller may use facial recognition techniques to track movements and positions of the individuals. In other examples, the first sensor device may generate data (e.g., image data) used to track movements of the individuals. The first sensor device 410 may alternatively include an IR tracking sensor, a LIDAR device, or another device capable of tracking positions of individuals the space 400. The controller of the sanitization system determines that the first individual 414 and the second individual 416 are within a threshold distance 418 (e.g., 6 feet) of each other, and responsively causes the UV light source 402 to emit UV light in accordance with a first light profile 420. As shown, the first light profile 420 covers a proximate region between the first individual 414 and the second individual 416, and also covers at least a portion of the second individual 416. The first light profile 420 is determined based on the first individual 414 being classified as the first type of individual and the second individual 416 being classified as the second type individual. The first light profile 420 gives the second individual 416 a dose of UV light while disinfecting the proximate region between the first individual 414 and the second individual 416.

The second UV light source 404 is proximate to a third individual 422 and a fourth individual 424. The third individual 422 is the first type of individual and the fourth individual 424 is the second type of individual. The sanitization system uses the first sensor device 410 to determine positions of the third individual 422 and the fourth individual 424. The controller of the sanitization system determines that the third individual 422 and the fourth individual 424 are within a threshold distance 426 (e.g., 6 feet) of each other, and responsively causes the second UV light source 404 to emit UV light in accordance with a second light profile 428. As shown, the second light profile 428 covers a proximate region between the third individual 422 and the fourth individual 424, and also is directed away from both the third individual 422 and the fourth individual 424. The second light profile 428 is determined based on the third individual 422 being classified as the first type of individual and the fourth individual 424 being classified as the second type individual. In addition, the second light profile 428 is determined based on an exposure parameter level of the fourth individual 424 being greater than a threshold value. Accordingly, the second UV light source 404 is controlled to disinfect the proximate region between the third individual 422 and the fourth individual 424 without providing the fourth individual 424 a dose of UV light.

The third UV light source 406 is proximate to a fifth individual 432 and a sixth individual 434. Both the fifth individual 432 and the sixth individual 434 are the second type of individual. The sanitization system uses the first sensor device 410 to determine positions of the fifth individual 432 and the sixth individual 434. The controller of the sanitization system determines that the fifth individual 432 and the sixth individual 434 are within a threshold distance 436 (e.g., 6 feet) of each other, and responsively causes the third UV light source 406 to emit UV light in accordance with a third light profile 438. As shown, the third light profile 438 covers a proximate region between the fifth individual 432 and the sixth individual 434, and also covers at least a portion of the fifth individual 432 and the sixth individual 434. The third light profile 438 is determined based on the fifth individual 432 and the sixth individual 434 being classified as the second type individual. In addition, the third light profile 438 is determined based on an exposure parameter level of the fifth individual 432 and the sixth individual 434 being less than a threshold value. Accordingly, the third UV light source 406 is controlled to disinfect the proximate region between the fifth individual 432 and the sixth individual 434 while also providing the fifth individual 432 and the sixth individual 434 a dose of UV light.

FIG. 4 shows that proximate regions are disinfected when two or more individuals are less than a threshold distance from one another. The sanitization system may accomplish this in part by monitoring predetermined interaction locations within the space 400. For example, the space 400 includes a predetermined interaction location 437, which is a counter separating individuals of the first type from individuals of the second type. Controlling the UV light source 402 and the second UV light source 404 may be performed based on monitoring the predetermined interaction location 437. For example, the first sensor device 410 may have a restricted field of view that focuses on areas surrounding the predetermined interaction location 437. Similarly, the space 400 includes a predetermined interaction location 440, which is a table separating two or more individuals of the second type from one another. Other predetermined interaction locations may be dispersed throughout the space and monitored to determine when individuals are less than a threshold distance from one another.

The sanitization system, may disinfect the space 400 in other contexts as well. For example, the sanitization system may operate in a first mode for disinfecting proximate regions between individuals and a second mode for disinfecting relatively high-traffic areas of the space 400. For example, the sanitization system may disinfect UV light zones that each correspond to a queue, hallway, doorway, or another area of the space 400 where human traffic is expected. In FIG. 4, a seventh individual 444 is in a UV light zone 442 corresponding to a lavatory hallway. As the seventh individual 444 moves through the lavatory hallway within the UV light zone 442, the second sensor device 412 senses movements of the seventh individual 444. For example, the second sensor device 412 may include an image capture device with a field of view that covers the UV light zone 442, and may generate data for use in tracking movements of the seventh individual 444. In the example scenario of FIG. 4, the controller may reduce a UV light level of the fourth UV light source 408 or otherwise alter how the fourth UV light source 408 emits UV light based on exposure parameter values of individuals in the UV light zone 442. In this manner, individuals of the first type may continue to intermittently receive doses of UV light when they enter high-traffic areas of the space 400.

As shown in FIG. 4, a single feature of a sanitization system (e.g., the controller or the first sensor device 410) can be associated with multiple different portions of the space 400. Further, though a single controller is described with respect to FIG. 4, a plurality of controllers can be used within the sanitization system. For example, each UV light source or motion sensor device may correspond to a different controller, and each controller may interact with one another or with a server in order to control UV light levels within the space 400.

Though FIG. 4 shows a particular arrangement of an interior of a building, other arrangements are possible, and similar sanitization systems may be implemented in other places, such as in a commercial aircraft, in a train, in a bus, or in an outdoor venue.

Figure 5:
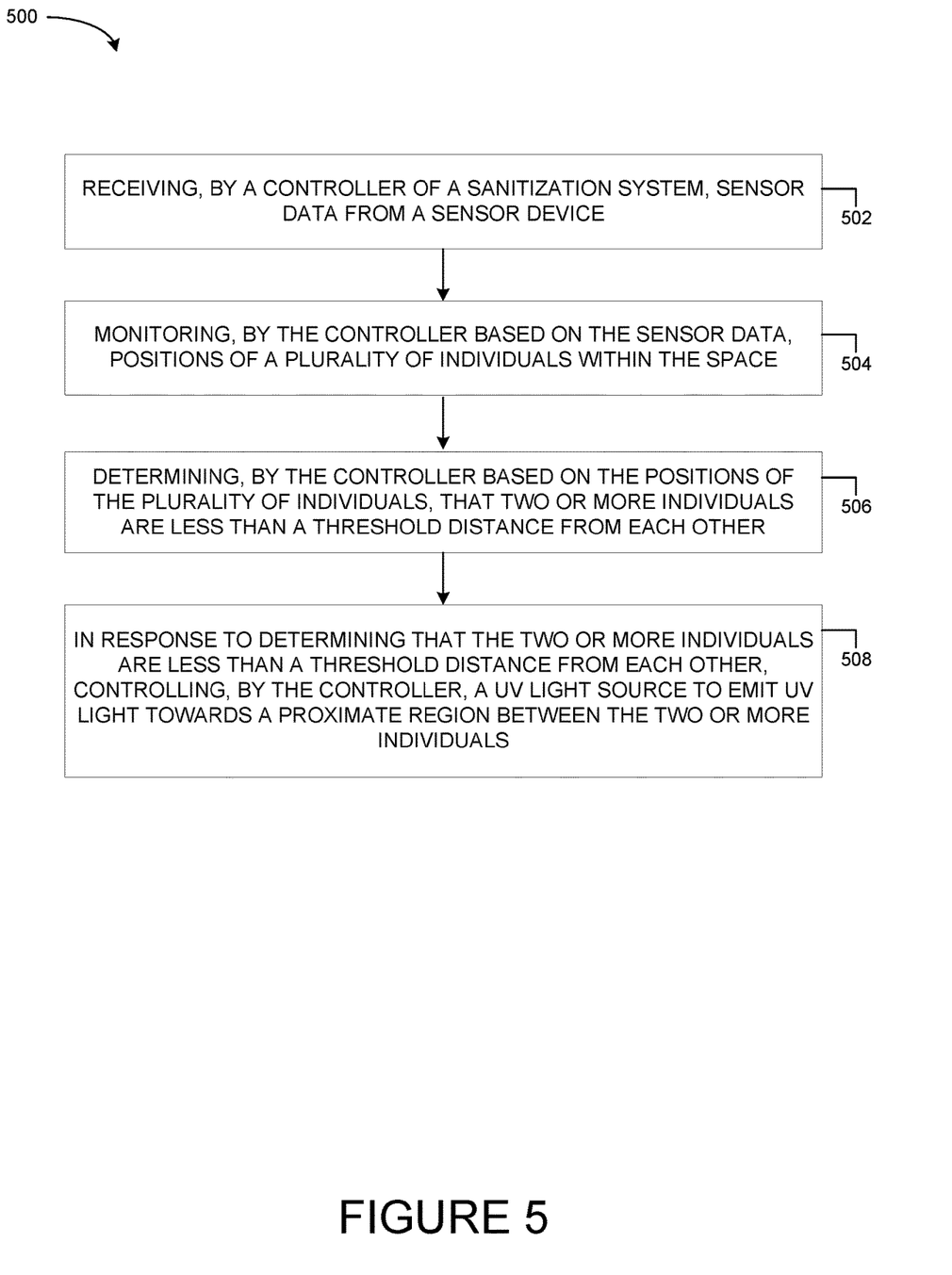
FIG. 5 illustrates a flowchart of a method for sanitizing a space, according to an example implementation.

FIG. 5 illustrates a flowchart of a method 500 for sanitizing a space (e.g., the space 400), according to an example implementation. The method 500 shown in FIG. 5 presents an example of a method that could be used with the sanitization system 100 or with components of thereof. Further, the functions described with respect to FIG. 5 may be supplemented by, replaced by, or combined with functions described above with respect to FIGS. 2A-4. Further, devices or systems may be used or configured to perform logical functions presented in FIG. 5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving, by a controller 102 of a sanitization system 100, sensor data from a sensor device 114.

At block 504, the method 500 includes monitoring, by the controller 102 based on the sensor data, positions of a plurality of individuals within the space 400. For example, the plurality of individuals may include a first individual 414 and a second individual 416. The controller 102 may perform facial recognition techniques, object detection techniques, pixelwise color thresholding, or other techniques for determining positions of each individual.

At block 506, the method 500 includes determining, by the controller 102 based on the positions of the plurality of individuals, that two or more individuals are less than a threshold distance (e.g., the threshold distance 418) from each other. For example, the positions can be represented as numerical coordinates, and distance can be calculated between the coordinates.

At block 508, the method 500 includes, in response to determining that the two or more individuals are less than a threshold distance from each other, controlling, by the controller 102, a UV light source 402 to emit UV light towards a proximate region (e.g., the proximate region 213) between the two or more individuals. For example, the proximate region may be a space defined by edges corresponding to coordinates of the positions of the two or more individuals.

Within examples, the method 500 further includes classifying each individual of the plurality of individuals as a type of individual. A first type of individual is expected to remain in the space for a specified timeframe (e.g., two or more hours), and a second type of individual is not expected to remain in the space for the specified timeframe. Classifying each individual as a type of individual may include comparing one or more features (e.g., facial features of each individual or identifying markers on a uniform of each individual) to a database of features to determine whether the features match a record of an individual designated as the first type of individual. The method 500 further includes determine that a respective individual of the two or more individuals is classified as the first type of individual. In these examples, controlling the UV light source 402 to emit UV light towards the proximate region between the two or more individuals includes controlling the UV light source 112 based on determining that the respective individual is classified as the first type of individual. For example, based on determining that the respective individual is classified as the first type of individual, the method includes 500 controlling the UV light source 402 to emit UV light to avoid the respective individual based on determining that the respective individual is classified as the first type of individual. For example, this may be performed as shown in FIG. 2B and FIG. 4.

In related examples, the method 500 further includes determining an exposure level of each individual classified as the first type of individual, training a machine learning model 306 using the exposure level of each individual classified as the first type of individual over a plurality of time cycles, and receiving from the machine learning model 306, a desired light profile 318 for controlling the UV light source 402. For example, this may be performed as described above with respect to FIGS. 3A and 3B. Within examples, controlling the UV light source 402 to emit UV light towards the proximate region between the two or more individuals includes controlling the UV light source 402 based on the desired light profile 318.

In related examples, the method 500 further includes determining a traffic level of individuals classified as the second type of individual. In these examples, controlling the UV light source 402 to emit UV light towards the proximate region between the two or more individuals includes controlling the UV light source 402 based on the traffic level. For example, the traffic level may be a number of individuals that enter the space 400 within a given timeframe (e.g., one hour). For example, controlling the UV light source 402 may be performed based on determining that the traffic level exceeds a threshold traffic level, and reduce a UV light level of the UV light source 402 based on determining that the traffic level exceeds the threshold traffic level.

In related examples, the method 500 further includes determining an expected total exposure level for individuals classified as the first type of individual based on the traffic level, and determining a desired UV light level for the UV light source 402 based on the expected total exposure level for the individuals classified as the first type of individual. In these examples, controlling the UV light source 402 to emit UV light towards the proximate region between the two or more individuals includes controlling the UV light source 402 reducing a UV light level of the UV light source 402 from a first UV light level to the desired UV light level. In these examples, reducing the UV light level of the UV light source 402 from the first UV light level to the desired UV light level includes providing an instruction for the individuals classified as the first type of individual. For example, the instruction may include an instruction to maintain a larger distance from other individuals in the space 400 or to apply additional protective items to avoid exposure to pathogens from other individuals in the space 400.

Within examples, prior to controlling the UV light source 402 to emit UV light towards a proximate region between the two or more individuals, the method 500 includes controlling the UV light source 402 to emit UV light towards one or more individuals classified as the second type of individual and to not emit UV light towards one or more individuals classified as the first type of individual. For example, this may be performed as shown in FIG. 2B.

Within examples, the method 500 further includes tracking a total exposure level for each of the plurality of individuals. In these examples, controlling the UV light source 402 to emit UV light towards the proximate region between the two or more individuals includes controlling the UV light source 402 to emit UV light based on the total exposure level of each of the two or more individuals. For example, this may be performed as described above with respect to FIG. 4.

Within examples, the space 400 includes a plurality of predetermined interaction locations for individuals within the space 400, and the plurality of predetermined interaction locations include the proximate region between the two or more individuals. For example, the plurality of predetermined interaction locations may be configured as shown in FIG. 4. In these examples, controlling the UV light source 402 to emit UV light towards the proximate region between the two or more individuals includes controlling the UV light source 402 identifying a predetermined interaction location (e.g., the predetermined interaction location 437) from the plurality of predetermined interaction locations that is between the two or more individuals, and setting the predetermined interaction location as the proximate region between the two or more individuals. In this manner, the sanitization system 100 may more consistently detect contexts for emitting UV light between two or more individuals.

Thus, the systems and methods described herein provide a framework for sanitizing a space while maintaining exposure parameter levels of individuals below a threshold level. In particular, sanitization systems are described that effectively disinfect visitors to a space while also protecting residents or workers within a space from pathogens. This allows for a space to be reliably disinfected throughout an extended period of time.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

By the term "simultaneously," it is meant that at least a portion of two different functions are being performed contemporaneously. For example, by referring to a plurality of objects being manufactured simultaneously, it is meant that two or more objects are contemporaneously disposed on a conveyor system used for manufacturing the objects.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A sanitization system for a space, comprising:
   an ultraviolet (UV) light source configured to emit UV light;
   a sensor device configured to sense positions of a plurality of individuals within the space; and
   a controller in communication with the sensor device and configured to:
      monitor the sensed positions of the plurality of individuals;
      compare the sensed positions of two or more individuals from the plurality of individuals to a threshold distance; and
      when the two or more individuals are less than the threshold distance from each other, control the UV light source to emit UV light towards a proximate region between the two or more individuals.

2. The sanitization system of claim 1, wherein the controller is further configured to:
   classify each individual of the plurality of individuals as a type of individual based on features of the individual, wherein a first type of individual includes the features that match a record of features of individuals who remain in the space for a specified timeframe, and wherein a second type of individual does not match the record; and
   when a respective individual of the two or more individuals is classified as the first type of individual, control the UV light source to emit UV light towards the proximate region between the two or more individuals.

3. The sanitization system of claim 2, wherein the controller is configured to control the UV light source to emit UV light to avoid the respective individual classified as the first type of individual.

4. The sanitization system of claim 2, further comprising a non-transitory computer-readable medium having instructions stored thereon that, when executed by one or more processors cause the controller to:
   train a machine learning model using an exposure level of each individual classified as the first type of individual over a plurality of time cycles;
   receive, from the machine learning model, a desired light profile for controlling the UV light source; and
   control the UV light source based on the desired light profile to emit UV light towards the proximate region between the two or more individuals.

5. The sanitization system of claim 2, wherein the controller is further configured to:
   control the UV light source to emit UV light towards the proximate region between the two or more individuals, the controller is configured to control the UV light source based on a traffic level.

6. The sanitization system of claim 5, wherein, to control the UV light source to emit UV light towards the proximate region between the two or more individuals, the controller is configured to:
reduce a UV light level of the UV light source when the traffic level exceeds a threshold traffic level.

7. The sanitization system of claim 5, wherein the controller is further configured to:
determine a desired UV light level for the UV light source based on an expected total exposure level for the individuals classified as the first type of individual,
wherein, to control the UV light source to emit UV light towards the proximate region between the two or more individuals, the controller is configured to reduce a UV light level of the UV light source from a first UV light level to the desired UV light level.

8. The sanitization system of claim 7, wherein the controller is further configured to:
notify the individuals classified as the first type of individual when the UV light level of the UV light source is reduced from the first UV light level to the desired UV light level.

9. The sanitization system of claim 2, wherein the controller is further configured to:
prior to controlling the UV light source to emit UV light towards a proximate region between the two or more individuals, emit UV light towards one or more individuals classified as the second type of individual and not emit UV light towards one or more individuals classified as the first type of individual.

10. The sanitization system of claim 1, wherein the controller is further configured to:
control the UV light source to emit UV light towards the proximate region between the two or more individuals, based on a total exposure level of each of the two or more individuals.

11. The sanitization system of claim 1, wherein the space comprises a plurality of interaction locations for individuals within the space, and wherein the plurality of interaction locations comprise the proximate region between the two or more individuals.

12. The sanitization system of claim 11, wherein, to control the UV light source to emit UV light towards the proximate region between the two or more individuals, the controller is configured to:
monitor each of the plurality of interaction locations using the sensor device; and
set an interaction location from the plurality of interaction locations that is between the two or more individuals as the proximate region between the two or more individuals.

13. A method for sanitizing a space, comprising:
receiving, by a controller of a sanitization system, sensor data from a sensor device;
monitoring, by the controller based on the sensor data, positions of a plurality of individuals within the space;
comparing the sensed positions of two or more individuals from the plurality of individuals to a threshold distance; and
when the two or more individuals are less than a threshold distance from each other, controlling, by the controller, a UV light source to emit UV light towards a proximate region between the two or more individuals.

14. The method of claim 13, further comprising:
classifying, by the controller, each individual of the plurality of individuals as a type of individual based on features of the individual, wherein a first type of individual includes the features that match a record of features of individuals who remain in the space for a specified timeframe, and a second type of individual does not match the record; and
when a respective individual of the two or more individuals is classified as the first type of individual,
controlling the UV light source to emit UV light towards the proximate region between the two or more individuals.

15. The method of claim 14, further comprising controlling the UV light source to emit UV light to avoid the respective individual classified as the first type of individual.

16. The method of claim 14, further comprising:
executing instructions stored on a non-transitory computer-readable medium, the instructions including:
training a machine learning model using an exposure level of each individual classified as the first type of individual over a plurality of time cycles;
receiving, by the controller from the machine learning model, a desired light profile for controlling the UV light source; and
controlling the UV light source based on the desired light profile to emit UV light towards the proximate region between the two or more individuals.

17. The method of claim 15, further comprising:
controlling the UV light source to emit UV light towards the proximate region between the two or more individuals comprises controlling the UV light source based on a traffic level.

18. The method of claim 17, wherein controlling the UV light source based on the traffic level comprises:
reducing a UV light level of the UV light source when the traffic level exceeds a threshold traffic level.

19. The method of claim 17, further comprising:
determining a desired UV light level for the UV light source based on an expected total exposure level for the individuals classified as the first type of individual,
wherein controlling UV light source to emit UV light towards the proximate region between the two or more individuals comprises reducing a UV light level of the UV light from a first UV light level to the desired UV light level.

20. A non-transitory computer readable medium having instructions stored thereon that, when executed by one or more processors cause a controller of a sanitization system to perform functions comprising:
receiving sensor data from a sensor device;
monitoring, based on the sensor data, positions of a plurality of individuals within a space;
determining, based on the positions of the plurality of individuals, that two or more individuals are less than a threshold distance from each other; and
in response to determining that the two or more individuals are less than a threshold distance from each other, controlling a UV light source to emit UV light towards a proximate region between the two or more individuals.

* * * * *